United States Patent
Kurtz et al.

(10) Patent No.: US 7,307,325 B2
(45) Date of Patent: Dec. 11, 2007

(54) HIGH TEMPERATURE INTERCONNECTS FOR HIGH TEMPERATURE TRANSDUCERS

(75) Inventors: Anthony D. Kurtz, Saddle River, NJ (US); Alexander A. Ned, Wayne, NJ (US); Scott J. Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 147 days.

(21) Appl. No.: 11/039,587

(22) Filed: Jan. 20, 2005

(65) Prior Publication Data

US 2006/0157840 A1 Jul. 20, 2006

(51) Int. Cl.
*H01L 29/84* (2006.01)
*H01L 31/058* (2006.01)

(52) U.S. Cl. .......................... 257/417; 257/414; 257/467
(58) Field of Classification Search ...................... None
See application file for complete search history.

(56) References Cited

U.S. PATENT DOCUMENTS

| | | |
|---|---|---|
| 5,955,771 A | 9/1999 | Kurtz et al. |
| 5,973,590 A * | 10/1999 | Kurtz et al. ................ 338/42 |
| 6,058,782 A | 5/2000 | Kurtz et al. |
| 6,221,989 B1 | 4/2001 | Furihata et al. |
| 6,891,711 B1 * | 5/2005 | Kurtz ......................... 361/277 |

* cited by examiner

*Primary Examiner*—Kiesha Rose
(74) *Attorney, Agent, or Firm*—Plevy, Howard & Darcy, PC

(57) ABSTRACT

A silicon wafer is fabricated utilizing two or more semiconductor wafers. The wafers are processed using conventional wafer processing techniques and the wafer contains a plurality of output terminals which essentially are platinum titanium metallization or high temperature contacts. A glass cover member is provided which has a plurality of through holes. Each through hole is associated with a contact on the semiconductor wafer. A high temperature lead is directed through the through hole or aperture in the glass cover and is bonded directly to the appropriate contact. The lead is of a sufficient length to extend into a second non through aperture in the contact glass. The non through aperture is located on the side of the contact glass not in contact with the silicon sensor. The non through aperture is then filled with a high temperature conductive glass frit. A plurality of slots are provided. Each slot is associated with a through and a non through aperture to accommodate the wire as directed from the through aperture through the slot and into the non through aperture. The slots provide means of retaining or securing the wire as it passes from the through aperture to the non through aperture. The non through apertures as indicated are filled with a high temperature conductive glass frit which glass frit accommodates suitable pins.

20 Claims, 2 Drawing Sheets

HIGH TEMPERATURE INTERCONNECTS FOR HIGH TEMPERATURE TRANSDUCERS

FIELD OF THE INVENTION

This invention relates to high temperature transducers and more particularly to a high temperature silicon on oxide transducer having high temperature interconnects.

BACKGROUND OF THE INVENTION

Semiconductor pressure transducers are frequently used in applications which require operation in harsh environments at high temperatures. These environments are corrosive and/or involve high temperatures. Thus, many transducers used in such applications are protected from these harsh environmental conditions in order for the transducer to remain operational over extended periods of time at elevated temperatures.

The Assignee herein, Kulite Semiconductor Products, Inc. has a number of patents which show transducers which are operational at extremely high temperatures in extremely harsh environments. A particular problem which is inherent in such transducers involves the contacts and output leads of the transducer as the contacts and output leads could fail at temperatures of 600° C. or greater. While these temperatures are very high it is, of course, desirable to operate at even higher temperatures.

In the prior art, a slice or wafer of silicon from which the sensor is formed had appropriate high temperature platinum based contact metallization and was bonded to a glass wafer. The glass wafer was typically Pyrex and the structure enabled one to provide an extremely high temperature transducer. The Pyrex had apertures which extended to the platinum based contacts associated with the silicon sensor and positioned on the silicon slice or wafer.

Contact was glass made to the platinum region of the silicon sensor wafer by means of a metallic frit and contact was made to the frit via very short pins on a header.

For examples of such devices, reference is made to Kulite U.S. Pat. No. 5,955,771 (771) entitled "SENSORS FOR USE IN HIGH VIBRATIONAL APPLICATIONS AND METHODS OF FABRICATING THE SAME", issued on Sep. 21, 1999 to A. D. Kurtz et al. and assigned to the Assignee herein. This patent shows a semiconductor chip which is hermetically bonded and sealed to the mounting surface of a Pyrex glass cover member.

The semiconductor chip has one or more contacts disposed on the surface for making electrical contact thereto. The Pyrex cover has one or more contact apertures extending therethrough which exposes a portion of the contacts. The portion of each pin extending above the mounting surface is received within the contact aperture and a conductive glass frit mixture is disposed in the contact apertures. The glass frit hermetically seals the contact apertures and provides electrical continuity between the pins and the contacts. See, for example, column 6, lines 44 to 67 of the 771 patent.

In any event, this prior technique operates quite well in harsh environments at temperatures over 500° C. and greater. See also, U.S. Pat. No. 5,973,590 (590) entitled "ULTRA THIN SURFACE MOUNT WAFER SENSOR STRUCTURES AND METHODS FOR FABARICATING THE SAME", issued on Oct. 26, 1999 to A. D. Kurtz et al. and assigned to the Assignee herein.

Referring to FIG. 10 of the 590 patent, a glass wafer is bonded to a silicon wafer. The glass wafer is electrostatically bonded to the silicon wafer and has apertures which are filled almost to the top surface with an unfired metal glass frit. Small spheres or balls of metal are inserted into the unfired frit leaving a portion of the ball protruding past the top edge. This provides a contact for the entire structure. In this the head portions of the header pins can be attached or further secured to the semiconductor surface by means of a gold epoxy or other adhesive substance to securely fasten the pins within the structure.

Reference is also made to U.S. Pat. No. 6,058,782 (782) entitled "HERMITICALLY SEALED ULTRA HIGH TEMPERATURE SILICON CARBIDE PRESSURE TRANSDUCERS AND METHODS FOR FABRICATING THE SAME". This patent issued on May 9, 2000 to A. D. Kurtz et al. and assigned to the Assignee herein. As seen this patent differs from the above noted patents in the fact that high temperature transducers using silicon carbide are employed. Even though these transducers are capable of operation at higher temperatures than silicon structures, the leads still had to be bonded to the substrate.

As one can ascertain, there is shown a second substrate of silicon carbide having a plurality of apertures extending therethrough, which apertures align and correspond to an associated contact on the contact area of the sensor substrate and is joined to that substrate by electrostatic bonding or by employing a glass frit. The apertures are filled with a glass metal frit mixture which includes platinum to provide a hermetic seal of the sensor element. A gold plated spherical contact pin is inserted into the glass metal frit filled apertures to provide contact means for the transducer.

An example of such a transducer in cross sectional view is shown in FIG. 4 of the 782 patent. As can be seen, the device depicted in the 782 patent is essentially a lead less device. The pins are coplanar with the second substrate and protrude into it. The pins are fabricated from nickel or Kovar which is a high temperature steel alloy. Pins are inserted into the filled apertures of the second substrate. The apertures are filled with a metal glass frit as indicated above. Such transducers as fabricated from the techniques described in the 782 patent can operate at temperatures of 600° C. or greater over an extended period of time.

Reference is also made to U.S. Pat. No. 6,210,989, (989) issued on Apr. 3, 2001 and entitled "ULTRA THIN SURFACE MOUNT WAFER SENSOR STRUCTURES AND METHODS FOR FABRICATING SAME". This patent issued to A. D. Kurtz et al. and is assigned to the Assignee herein. The 989 patent is a divisional of U.S. Pat. No. 5,973,590 as described above and essentially shows the apertures aligned with the first glass member and having a group of hermetically sealed pins for coupling to the contact locations.

In regard to the above noted techniques, the high temperature platinum based metallization contacts are on the sensor wafer. The sensor wafer is associated with and bonded to a glass wafer having contact apertures. The apertures extended to the platinum based contacts on the silicon sensor wafer. Contact was made to the platinum region of the silicon sensor wafer by means of a conductive metallic frit and contact was made to the frit by very short pins on a header.

In any event, in spite of the vast improvement in temperature operation it has been discovered that the upper temperature limit of the bond or the interconnection between the platinum metallization on the silicon sensor and the conductive glass metal frit was in the neighborhood of 625° C. While this temperature is extremely high, it has been discovered that a substantial improvement can be achieved.

It is therefore an object of the present invention to provide improved contact or interconnect structures which enable operation of pressure transducers to extend to well over 700° C. Thus, it is really intended to produce high temperature leads or interconnect for any type of semiconductor wafer especially wafers which include piezoresistor devices for high temperature transducer operation.

SUMMARY OF THE INVENTION

A high temperature semiconductor comprising: a first semiconductor wafer having at least one semiconductor device located on a first surface thereof and associated with a contact area to enable contact to be made to said device, a cover member having a first through aperture directed from a first surface in contact with said first surface of said semiconductor wafer and with said aperture directed to a second surface of said glass cover wafer, a second aperture located adjacent said through aperture on said second surface and not extending to said first surface, a high temperature wire connected to said contact area and extending through said first aperture into said second aperture, said second aperture filled with a high temperature conductive frit to enable contact to be made to said contact area of said semiconductor device.

DETAILED DESCRIPTION OF THE INVENTION

Figure 1:
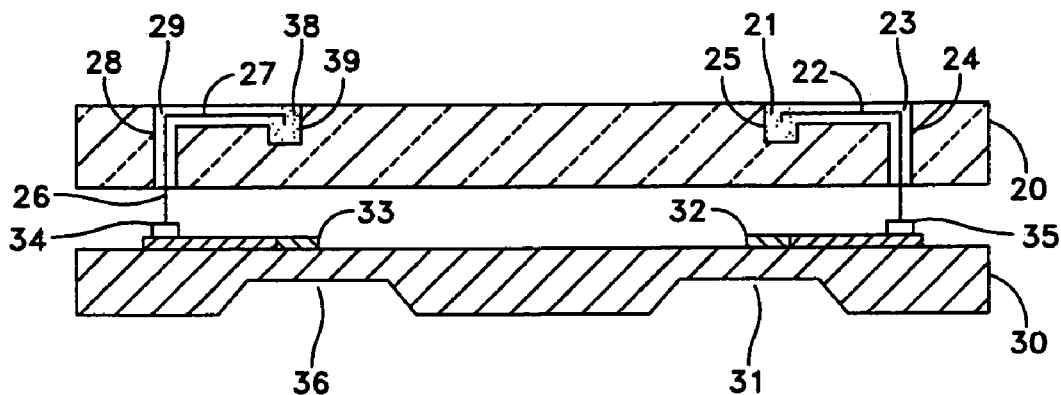
FIG. 1 depicts a semiconductor wafer and a glass wafer having contact apertures according to the present invention.

Referring to FIG. 1, there is shown a cross sectional view of a transducer according to this invention. As one can ascertain in FIG. 1 the transducer basically consists of a glass cover member 20 and a semiconductor wafer 30. The wafers 20 and 30 are shown separated from each other but, of course, are bonded together to form a composite structure of a silicon sensor wafer having a glass cover member. Semiconductor wafer 30 has a plurality of active areas such as 31 and 36 which represent thin diaphragm areas. Located on each area are piezoresistive sensors such as 32 and 33. Each sensor has contacts emanating therefrom such as 34 and 35 which contacts are coupled to the sensors 32 and 33.

The contacts or metallized areas 34 and 35 have to be directed out through the semiconductor member to allow one to use the device in an application. As shown in FIG. 1, the glass cover layer 20 which eventually will be bonded to the silicon wafer 30 has a through aperture 28 which extends from one end to the other end of the glass wafer. The aperture 28 is contiguous with a slot 27. Slot 27 is directed into non through or partial aperture 38. The partial aperture 38 is filled with a glass frit 39. Extending from the contact 34 is a platinum or other high temperature wire 26. The wire 26 extends up through the through aperture 28 and is directed into slot 27 and terminates at aperture 38 which as indicated is a partial aperture. The aperture 38 is consequently filled with a glass metal frit of the high temperature kind. The partial aperture 38 is located adjacent the through aperture 28 but is separate therefrom. As seen from FIG. 1, the partial aperture extends into the glass cover member 20 from the top towards the bottom of the glass member 20. The partial aperture is not in contact with the semiconductor member and is separated therefrom.

Similarly as shown on the right side of the diaphragm is another through aperture 24 which communicates with another contact area 35. Through aperture 24 is associated with a high temperature wire 23 which is directed into slot 22 and then into the non through aperture 25. The non through aperture 25 is again filled with a glass frit 21. Each contact area of the wafer 30 is handled in a similar manner.

Thus, a high temperature lead 26 is bonded through an aperture such as aperture 28 in the contact glass 20 directed to an associated platinum metallized contact as 34. The lead 26 is of a sufficient length to extend into a second non through or partial aperture 38 in the contact glass 20. The non through apertures such as 38 and 25 are located on the side of the contact glass not in contact with the silicon sensor. The non through aperture is then filled with the high temperature conductive frit. Suitable frits are disclosed in the above noted patents.

Thus, the contact glass structure 20 is comprised of a series of through apertures such as 28 and 24 each being aligned with the appropriate platinum contacts such as 34 and 35 on the semiconductor substrate and a series of non through apertures such as 38 and 25 each being relatively adjacent to an associated through aperture. The slots such as 27 and 22 connect the through and the non through apertures as seen in FIG. 1. Each slot provides means of retaining or securing the wire as it passes from the through aperture to the non through aperture. Contact to the non through apertures such as 39 and 25 is made through the glass metal frit which accommodates miniature pins as described in any one of the above noted patents.

Figure 2:
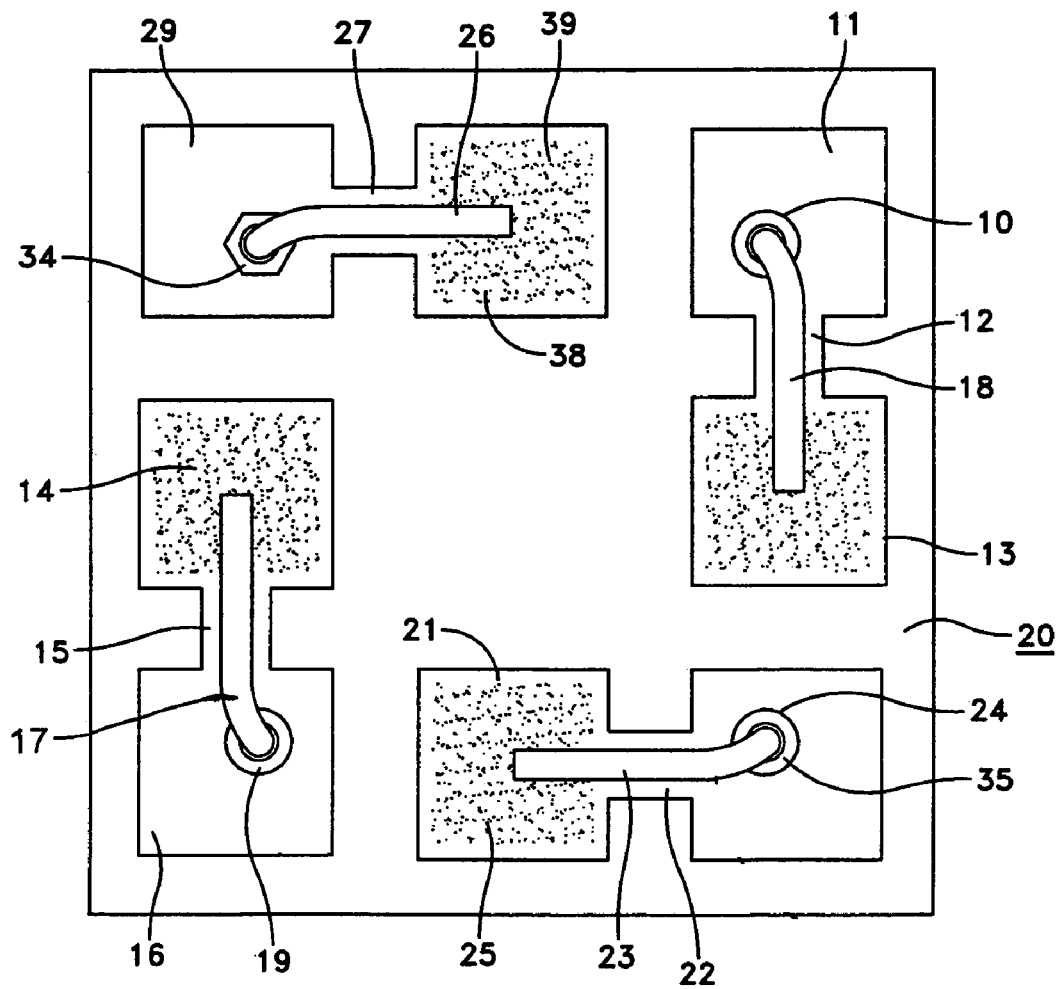
FIG. 2 is a top plan view of a glass wafer according to this invention.

Referring to FIG. 2, there is shown a top plan view of the glass cover member including the wires and apertures as depicted in FIG. 1. For convenience, the same reference numerals have been used to depict similar corresponding parts.

As can be seen from FIG. 2, the top plan view of a pressure sensor includes four contact areas 10, 19, 34 and 35. Such pressure sensors utilize piezoresistive elements which are arranged in a Wheatstone bridge or other configuration.

In this manner, while the Wheatstone bridge has four active contacts, it is understood that the transducers or the piezoresistive elements can be arranged in half bridge or be employed as single resistors. In any event, four contact areas are normally provided.

As seen in FIG. 2, the through aperture 29 overlies the contact area 34. The contact area is connected by means of wire 26 which is directed from the contact area 34 through the aperture 29 into slot 27 and then into the non through aperture 39 which is filled with a glass metal frit 38. Contact to a transducer terminal is made via contact member 34 and eventually to the non through aperture 39 which is filled with a conductive frit 38. A suitable pin is placed in contact with the frit in aperture 38.

In a similar manner as can be seen additional contact areas as 10 is associated with a through aperture 11 which through aperture 11 accommodates a high temperature platinum wire 18. The platinum wire 18 is directed through the slot 12 and is terminated in a non through aperture 13 which again is filled with a frit and eventually makes contact with a suitable header pin.

In a similar manner, contact area 35 has a through aperture 24 which makes contact with contact 35 via a high temperature wire 33, the wire 33 is directed through the slot 22 into the non through aperture 25 which again is filled with a suitable frit as 21 to provide a contact area for a suitable metal pin.

The contact area 19 is associated with a through hole 16. A high temperature e wire 17 is again directed through the aperture 16 is positioned within a slot 15 and is then connected to a frit which is positioned in the non through aperture 14.

Figure 3:
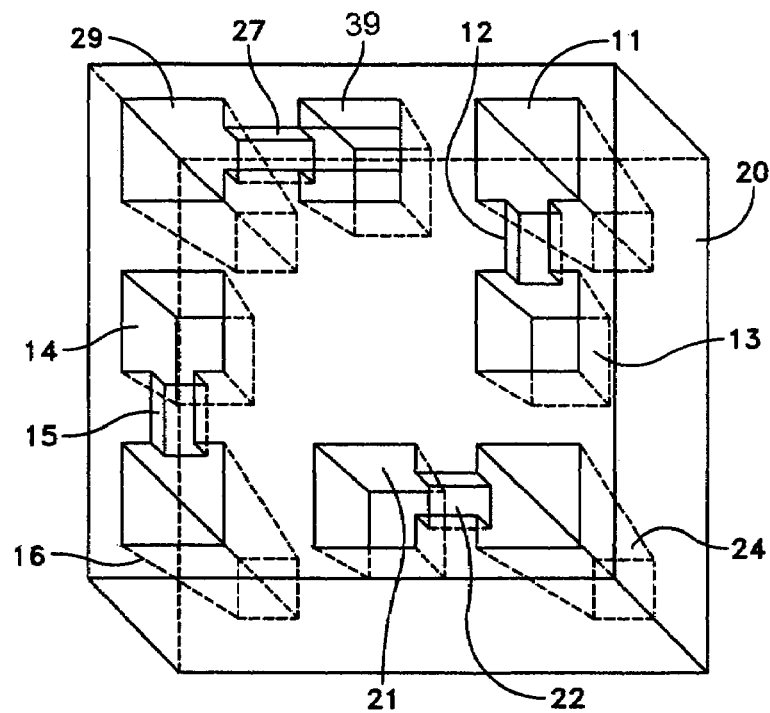
FIG. 3 is a perspective view of the glass wafer depicting the aperture configurations needed in order to make contact to a semiconductor wafer.

As shown in FIG. 3, there is shown the various apertures as fabricated in the glass wafer 20. The Figure depicts the nature of each aperture and slot. There is shown the through aperture 29 which as indicated is associated with the contact area 34. The aperture 29 is associated with the slot 27. The slot 27 directs aperture 29 to the non through aperture 39. The non through aperture 39 as indicated would be filed with a suitable conductive frit.

Hence, as one can see the structure manifests itself in the fact that the glass cover member 20 has a plurality of apertures associated with each contact. There is a first through aperture which is associated with each terminal contact of the silicon sensor which through aperture enables contact with a contact area on the sensor wafer and which through aperture accommodates a high temperature wire. The high temperature wire is directed from the contact on the silicon substrate through the through aperture into the slot 27 and then into the non through aperture 39. The non through aperture 39 is filled with a conductive frit. The structure as indicated is quite simple but enables one to provide high temperature transducers which essentially enable operation at temperatures well over 700° C. This is a vast improvement over prior art temperature operation.

Figure 4:
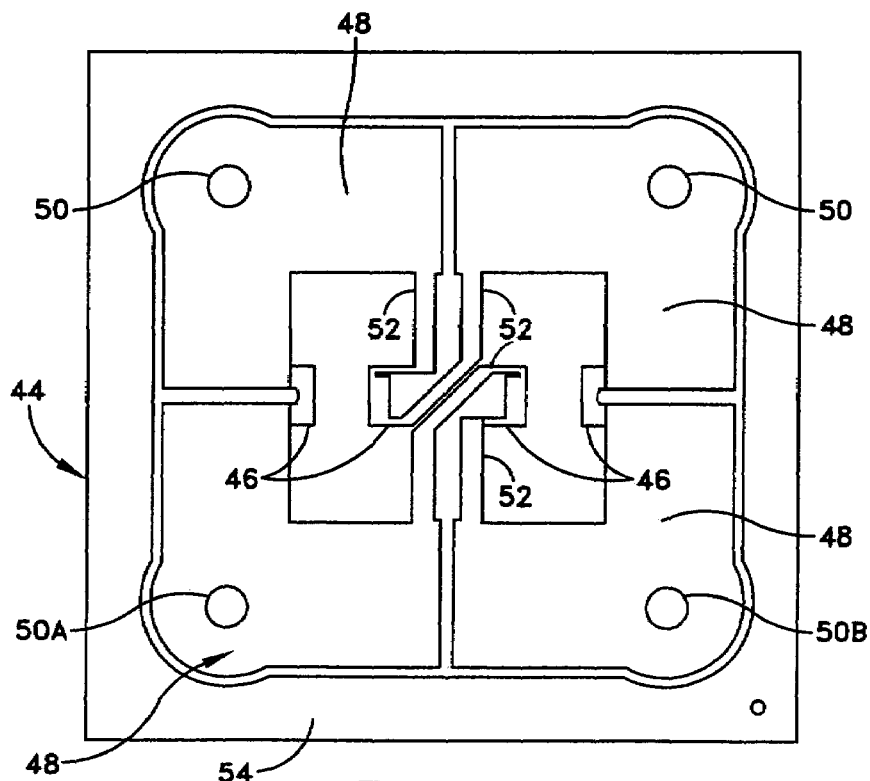
FIG. 4 is a top plan view of a typical semiconductor wafer which may be employed with the glass wafer according to this invention.

Referring to FIG. 4, there is shown on a top plan view of a typical silicon sensor which may be employed in conjunction with this invention. The structure shown in FIG. 4 is the silicon sensor which is depicted in FIG. 2 of U.S. Pat. No. 6,210,989 (989) issued on Apr. 3, 2001.

The 989 patent entitled "ULTRA THIN SERVICE MOUNT WAFER SENSOR STRUCTURES AND METHODS FOR FABRICATING THE SAME" is a divisional of U.S. Pat. No. 5,973,590.

FIG. 4 shows a top plan view of a high temperature silicon sensor which is fabricated according to the teachings of the above noted patents as well as copending applications. Referring to FIG. 4, a top plan view of a typical silicon sensor is shown. The sensor 44 is approximately 100 mils by 100 mils and is fabricated from two or more semiconductor wafers of silicon or any other suitable semiconductor wafer material such as silicon carbide and so on. The transducer 44 is fabricated using conventional wafer processing techniques which provide a number of dielectrically isolated piezoresistor sensor elements such as 46, each sensor element is composed of highly doped (P+) silicon formed on the semiconductor material using dielectric films of silicon dioxide ($SiO_2$) or the like.

It is understood that a number of such sensors can be made at the same time on a large substrate. Each sensor element such as 46 is essentially a variable resistor and functions as one of four legs of a Wheatstone bridge circuit with each of the respective resistances varying in proportion to an applied force or pressure imposed on the transducer structure 44. The Wheatstone bridge consists of four oversized P+ diffused silicon electrical contact areas or fingers 48. The fingers 48 are mainly located in non active areas of the transducer 44. The term "finger" is used to indicate that the areas 48 project from the sensors 44 to the metal contacts 50. The metal contacts 50 within the contact area are circular in shape and each are approximately 10 mils in diameter. Each contact 48 includes a centrally located terminal area of a high temperature platinum titanium metallization 50. The terminals 50 (as one can ascertain from FIG. 4) are four in number. Thus, two of the terminals 50 correspond to terminals 34 and 35 of FIG. 1. It is understood that terminals 50$a$ and 50$b$ correspond to terminals 19 and 35 of FIG. 2.

The silicon sensor 44 operates in conjunction with the glass cover member 20 to enable high temperature leads such as platinum wires to be directed through the through apertures as for example apertures 29 and 11 and through the associated slots as 27 and 12 to be directed to the non through apertures 38 and 13. The non through or partial apertures contain a conductive frit. This enables high temperature operation of the transducers as compared to prior art devices.

Thus as one can ascertain, there is described a method and structure for making ultra high temperature silicon on oxide (SOI) piezoresistive transducers which include high temperature leads or interconnects. The leads are bonded via the through apertures in the contact glass member directly to the appropriate platinum metallized contact areas. The leads are of such a length to enable the lead to extend into a second adjacent partial aperture in the contact glass via an associated slot. The non through apertures are located on the side of the contact glass not in contact with the silicon sensor. The non through apertures are filled with a high temperature conductive glass frit and a suitable contact pin is coupled to the frit associated with each of the non through apertures.

It will be therefore apparent to one skilled in the art that many alternative embodiments of the present invention can be envisoned all of which are considered to be within the breadth and scope of the claims appended hereto.

What is claimed is:

1. A high temperature semiconductor comprising:
    a first semiconductor wafer having at least one semiconductor device located on a first surface thereof and associated with a contact area to enable contact to be made to said device, a cover member having a first through aperture directed from a first surface in contact with said first surface of said semiconductor wafer and with said aperture directed to a second surface of said cover wafer, a second aperture located adjacent said through aperture on said second surface and not extending to said first surface, a high temperature wire connected to said contact area and extending through said first aperture into said second aperture, said second aperture filled with a high temperature conductive frit to enable contact to be made to said contact area of said semiconductor device.

2. The high temperature semiconductor according to claim 1, wherein said semiconductor device is a silicon piezoresistor.

3. The high temperature semiconductor according to claim 1, wherein said cover member is fabricated from glass.

4. The high temperature semiconductor according to claim 3, further including at least one slot located on said second surface of said glass cover member and positioned to enable said first aperture to communicate with said second aperture, said slot accommodating said high temperature wire as directed from said first to said second apertures.

5. The high temperature semiconductor according to claim 1, wherein said contact area is a platinum metallization.

6. The high temperature semiconductor according to claim 1, wherein said high temperature wire is a platinum wire.

7. The high temperature semiconductor according to claim 1, wherein said semiconductor device operates at temperatures in excess of 700° C.

8. The high temperature semiconductor according to claim 1, further including a contact pin positioned to contact said conductive frit in said second aperture.

9. The high temperature semiconductor according to claim 1, wherein said at least one semiconductor device is a piezoresistive Wheatstone bridge array having four contact areas, with said cover member having said through aperture aligned with each contact area, with each through aperture associated with a said non through aperture, with each non through aperture filled with a conductive frit and with each contact area connected to said conductive frit via a separate high temperature wire connected to an associated contact area and directed through an associated through aperture into said associated non through aperture to connect to said frit.

10. The high temperature semiconductor according to claim 8, further including a slot associated with each through aperture to enable said associated through aperture to communicate with said non through aperture, said slot accommodating said high temperature wire as directed from said through aperture to said non through aperture.

11. A method of connecting a contact area on a semiconductor substrate containing a semiconductor device to a contact terminal on an insulative cover member for said substrate to enable high temperature operation, comprising the steps of:

providing a through aperture on said insulative cover member directed from said contact area on said semiconductor substrate through said cover member, forming a second aperture on said cover member adjacent said through aperture, said second aperture extending partially into said cover member;

connecting a high temperature wire to said contact area;

directing said wire through said through aperture into said second aperture;

filling said second aperture with a conductive frit to enable contact to be made at said second aperture to said contact area.

12. The method according to claim 11, further providing the step of forming a slot on the surface of said insulative cover member common to said first and second apertures, said slot communicating between said apertures to accommodate said wire as directed from said first to said second aperture.

13. The method according to claim 11, wherein said semiconductor device is a piezoresistive transducer.

14. The method according to claim 12, wherein said semiconductor substrate is silicon.

15. The method according to claim 12, wherein said piezoresistive transducer is a Wheatstone bridge having four contact areas each connected to an associated conductive frit via the method of claim 11.

16. The method according to claim 11, wherein said high temperature operation is in excess of 700° C.

17. The method according to claim 11, wherein said high temperature wire is platinum.

18. The method according to claim 11, wherein said insulative cover member is glass.

19. The method according to claim 11, wherein said contact area is platinum.

20. The method according to claim 11, further including the step of placing a conductive pin in contact with said conductive first to enable communication to said semiconductor device.

* * * * *